United States Patent
Chen et al.

(10) Patent No.: US 8,639,086 B2
(45) Date of Patent: Jan. 28, 2014

(54) RENDERING OF VIDEO BASED ON OVERLAYING OF BITMAPPED IMAGES

(75) Inventors: Chris C. Chen, Davis, CA (US); Daniel T. Hai, Brooklyn, NY (US)

(73) Assignee: Adobe Systems Incorporated, San Jose, CA (US)

( * ) Notice: Subject to any disclaimer, the term of this patent is extended or adjusted under 35 U.S.C. 154(b) by 690 days.

(21) Appl. No.: 12/349,402

(22) Filed: Jan. 6, 2009

(65) Prior Publication Data

US 2013/0195421 A1    Aug. 1, 2013

(51) Int. Cl.
*H04N 5/932* (2006.01)

(52) U.S. Cl.
USPC ............ 386/215; 386/216; 386/218; 386/219

(58) Field of Classification Search
USPC .................................. 386/215, 216, 218, 219
See application file for complete search history.

(56) References Cited

U.S. PATENT DOCUMENTS

| | | | |
|---|---|---|---|
| 2,258,351 A | 10/1941 | Brown, Jr. | |
| 5,109,482 A | 4/1992 | Bohrman | |
| 5,485,611 A | 1/1996 | Astle | |
| 5,519,828 A | 5/1996 | Rayner | |
| 5,627,765 A | 5/1997 | Robotham et al. | |
| 5,717,869 A | 2/1998 | Moran et al. | |
| 5,781,188 A | 7/1998 | Amiot et al. | |
| 5,781,894 A | 7/1998 | Petrecca et al. | |
| 5,892,507 A | 4/1999 | Moorby et al. | |
| 5,915,067 A | 6/1999 | Nonomura et al. | |
| 5,966,121 A | 10/1999 | Hubbell et al. | |
| 5,996,007 A | 11/1999 | Klug et al. | |
| 6,182,050 B1 | 1/2001 | Ballard | |
| 6,188,396 B1 | 2/2001 | Boezeman et al. | |
| 6,204,840 B1 | 3/2001 | Petelycky et al. | |
| 6,216,112 B1 | 4/2001 | Fuller et al. | |
| 6,222,925 B1 | 4/2001 | Shiels et al. | |
| 6,266,053 B1 | 7/2001 | French et al. | |
| 6,285,823 B1 | 9/2001 | Saeki et al. | |
| 6,304,852 B1 | 10/2001 | Loncteaux | |
| 6,317,795 B1 | 11/2001 | Malkin et al. | |
| 6,373,498 B1 | 4/2002 | Abgrall | |
| 6,415,326 B1 | 7/2002 | Gupta et al. | |

(Continued)

OTHER PUBLICATIONS

United States Patent and Trademark Office, Office Action, U.S. Appl No. 11/705,983, mailed Jun. 23, 2011.

(Continued)

*Primary Examiner* — Thai Tran
*Assistant Examiner* — Jose Mesa
(74) *Attorney, Agent, or Firm* — Kilpatrick Townsend & Stockton LLP

(57) ABSTRACT

According to example configurations as described herein, a media manager supports functions such as in-line display of video frame information for application of editing commands. Each of multiple frames in the in-line display can be derived from a respective bitmap. The bitmaps associated with the in-line display can be generated and cached during an editing session for easy access. After completion of the editing session and creation of a playback file specifying a media playback experience, a media manager deletes the cached bitmaps. Upon rendering of a video experience as specified by the playback file at a later time, a respective media player converts a format of video data as specified by the playback file into bitmap information again. Playback can include combining multiple frames of static images (as defined by the bitmaps) at different layers to produce a unique viewing experience.

29 Claims, 10 Drawing Sheets

(56) References Cited

U.S. PATENT DOCUMENTS

| | | |
|---|---|---|
| 6,438,750 B1 | 8/2002 | Anderson |
| 6,535,686 B1 | 3/2003 | Yanase et al. |
| 6,549,221 B1 | 4/2003 | Brown et al. |
| 6,587,138 B1 | 7/2003 | Vogt et al. |
| 6,665,653 B1 | 12/2003 | Heckerman et al. |
| 6,683,649 B1 | 1/2004 | Anderson |
| 6,748,397 B2 | 6/2004 | Choi |
| 6,757,027 B1 | 6/2004 | Edwards et al. |
| 6,760,042 B2 | 7/2004 | Zetts |
| 6,791,572 B1 | 9/2004 | Cloney et al. |
| 6,804,659 B1 | 10/2004 | Graham et al. |
| 6,832,387 B2 | 12/2004 | Grooters et al. |
| 6,897,880 B2 | 5/2005 | Samra |
| 6,928,613 B1 | 8/2005 | Ishii et al. |
| 6,956,574 B1 | 10/2005 | Cailloux et al. |
| 7,020,381 B1 | 3/2006 | Kato et al. |
| 7,055,100 B2 | 5/2006 | Moriwake et al. |
| 7,057,591 B1 | 6/2006 | Hautanen et al. |
| 7,069,310 B1 | 6/2006 | Bartholomew |
| 7,093,198 B1 | 8/2006 | Paatero et al. |
| 7,123,696 B2 | 10/2006 | Lowe |
| 7,165,041 B1 | 1/2007 | Guheen et al. |
| 7,181,415 B2 | 2/2007 | Blaser et al. |
| 7,190,369 B2 | 3/2007 | Fernandez et al. |
| 7,197,715 B1 | 3/2007 | Valeria |
| 7,278,109 B2 | 10/2007 | Shalabi et al. |
| 7,280,738 B2 | 10/2007 | Kauffman et al. |
| 7,337,403 B2 | 2/2008 | Pavley et al. |
| 7,426,691 B2 | 9/2008 | Novak et al. |
| 7,432,940 B2 | 10/2008 | Brook et al. |
| 7,434,155 B2 | 10/2008 | Lee |
| 7,472,102 B1 | 12/2008 | Heckerman et al. |
| 7,472,198 B2 | 12/2008 | Gupta et al. |
| 7,496,857 B2 | 2/2009 | Stata et al. |
| 7,500,198 B2 | 3/2009 | Mathews et al. |
| 7,502,808 B2 | 3/2009 | Hui et al. |
| 7,546,532 B1 | 6/2009 | Nichols et al. |
| 7,546,544 B1 | 6/2009 | Weber et al. |
| 7,587,674 B2 | 9/2009 | Broeksteeg |
| 7,636,889 B2 | 12/2009 | Weber et al. |
| 7,644,364 B2 | 1/2010 | Patten et al. |
| 7,694,225 B1 | 4/2010 | Weber et al. |
| 7,702,014 B1 | 4/2010 | Kellock et al. |
| 7,725,828 B1 | 5/2010 | Johnson |
| 7,769,829 B1* | 8/2010 | Riggs et al. .................. 709/219 |
| 7,784,069 B2 | 8/2010 | Boss et al. |
| 7,823,055 B2 | 10/2010 | Sull et al. |
| 7,827,490 B2 | 11/2010 | Kapur et al. |
| 8,065,604 B2 | 11/2011 | Blankinship |
| 8,150,237 B2 | 4/2012 | Hamada et al. |
| 2001/0036356 A1 | 11/2001 | Weaver et al. |
| 2002/0033842 A1 | 3/2002 | Zetts |
| 2002/0069218 A1 | 6/2002 | Sull et al. |
| 2002/0107759 A1 | 8/2002 | An |
| 2002/0112005 A1 | 8/2002 | Namias |
| 2002/0116716 A1 | 8/2002 | Sideman |
| 2002/0120564 A1 | 8/2002 | Strietzel |
| 2002/0133565 A1 | 9/2002 | Huat |
| 2002/0152233 A1* | 10/2002 | Cheong et al. ............ 707/500.1 |
| 2002/0154163 A1 | 10/2002 | Melchner |
| 2002/0169797 A1 | 11/2002 | Hegde et al. |
| 2002/0170068 A1 | 11/2002 | Rafey et al. |
| 2002/0180774 A1 | 12/2002 | Errico et al. |
| 2002/0194618 A1 | 12/2002 | Okada et al. |
| 2003/0026592 A1 | 2/2003 | Kawahara et al. |
| 2003/0040982 A1 | 2/2003 | Yang |
| 2003/0052910 A1 | 3/2003 | Shiiyama |
| 2003/0108329 A1 | 6/2003 | Adriansen et al. |
| 2003/0123840 A1 | 7/2003 | Fujinami |
| 2003/0200197 A1* | 10/2003 | Long et al. ........................ 707/1 |
| 2003/0219234 A1* | 11/2003 | Burda .......................... 386/111 |
| 2003/0226142 A1 | 12/2003 | Rand |
| 2004/0001079 A1 | 1/2004 | Zhao et al. |
| 2004/0001106 A1 | 1/2004 | Deutscher et al. |
| 2004/0010546 A1 | 1/2004 | Klug et al. |
| 2004/0027367 A1* | 2/2004 | Pilu ................................ 345/716 |
| 2004/0091243 A1 | 5/2004 | Theriault et al. |
| 2004/0095382 A1 | 5/2004 | Fisher et al. |
| 2004/0100482 A1* | 5/2004 | Cajolet et al. ................. 345/716 |
| 2004/0125124 A1 | 7/2004 | Kim et al. |
| 2004/0125150 A1 | 7/2004 | Adcock et al. |
| 2004/0130574 A1 | 7/2004 | Kautto-Koivula et al. |
| 2004/0143838 A1 | 7/2004 | Yu et al. |
| 2004/0162760 A1 | 8/2004 | Seet et al. |
| 2004/0171378 A1 | 9/2004 | Rautila |
| 2004/0172325 A1 | 9/2004 | Blanco et al. |
| 2004/0177382 A1 | 9/2004 | Choi |
| 2004/0201610 A1 | 10/2004 | Rosen et al. |
| 2004/0221225 A1 | 11/2004 | Hyman et al. |
| 2004/0230655 A1 | 11/2004 | Li et al. |
| 2004/0233209 A1 | 11/2004 | Evans et al. |
| 2004/0243637 A1 | 12/2004 | Friedman |
| 2004/0261100 A1 | 12/2004 | Huber et al. |
| 2004/0268384 A1 | 12/2004 | Stone |
| 2005/0020359 A1 | 1/2005 | Ackley et al. |
| 2005/0033849 A1 | 2/2005 | Matz |
| 2005/0034083 A1 | 2/2005 | Jaeger |
| 2005/0053356 A1 | 3/2005 | Mate et al. |
| 2005/0060741 A1 | 3/2005 | Tsutsui et al. |
| 2005/0091251 A1 | 4/2005 | Ramarao |
| 2005/0091576 A1 | 4/2005 | Relyea et al. |
| 2005/0105888 A1 | 5/2005 | Hamada et al. |
| 2005/0129187 A1 | 6/2005 | Agapi et al. |
| 2005/0193408 A1 | 9/2005 | Sull et al. |
| 2005/0215238 A1 | 9/2005 | Macaluso |
| 2005/0254363 A1 | 11/2005 | Hamada et al. |
| 2005/0259956 A1 | 11/2005 | Chen |
| 2005/0273355 A1 | 12/2005 | Yamada |
| 2005/0276573 A1 | 12/2005 | Abbate |
| 2006/0004685 A1 | 1/2006 | Pyhalammi et al. |
| 2006/0026628 A1 | 2/2006 | Wan et al. |
| 2006/0064716 A1 | 3/2006 | Sull et al. |
| 2006/0064733 A1 | 3/2006 | Norton et al. |
| 2006/0125149 A1 | 6/2006 | Takada et al. |
| 2006/0128317 A1 | 6/2006 | Halfmann et al. |
| 2006/0149781 A1 | 7/2006 | Blankinship |
| 2006/0156219 A1 | 7/2006 | Haot et al. |
| 2006/0195786 A1 | 8/2006 | Stoen et al. |
| 2006/0218617 A1 | 9/2006 | Bradstreet et al. |
| 2006/0253781 A1 | 11/2006 | Pea et al. |
| 2007/0033515 A1 | 2/2007 | Sull et al. |
| 2007/0033632 A1 | 2/2007 | Baynger et al. |
| 2007/0043616 A1 | 2/2007 | Kutaragi et al. |
| 2007/0044010 A1 | 2/2007 | Sull et al. |
| 2007/0079331 A1 | 4/2007 | Datta et al. |
| 2007/0099684 A1 | 5/2007 | Butterworth |
| 2007/0118807 A1 | 5/2007 | Komura et al. |
| 2007/0124762 A1 | 5/2007 | Chickering et al. |
| 2007/0143801 A1* | 6/2007 | Madonna et al. ................ 725/80 |
| 2007/0168462 A1 | 7/2007 | Grossberg et al. |
| 2007/0201558 A1 | 8/2007 | Xu et al. |
| 2007/0230807 A1 | 10/2007 | Shiiyama |
| 2007/0233840 A1* | 10/2007 | Alstrup et al. ................. 709/223 |
| 2008/0013915 A1 | 1/2008 | Gill et al. |
| 2008/0016114 A1 | 1/2008 | Beauregard et al. |
| 2008/0025478 A1 | 1/2008 | Taylor et al. |
| 2008/0046925 A1 | 2/2008 | Lee et al. |
| 2008/0068458 A1* | 3/2008 | Carroll .......................... 348/143 |
| 2008/0109305 A1 | 5/2008 | Hengel et al. |
| 2008/0178211 A1 | 7/2008 | Lillo et al. |
| 2008/0195471 A1 | 8/2008 | Dube et al. |
| 2008/0253735 A1 | 10/2008 | Kuspa et al. |
| 2009/0177301 A1 | 7/2009 | Hayes |
| 2009/0210779 A1 | 8/2009 | Badoiu et al. |
| 2009/0310932 A1* | 12/2009 | Hsieh et al. ...................... 386/55 |
| 2010/0095211 A1 | 4/2010 | Kenvin et al. |
| 2010/0192219 A1 | 7/2010 | Carvajal et al. |
| 2011/0119588 A1 | 5/2011 | Siracusano, Jr. |
| 2011/0197131 A1 | 8/2011 | Duffin et al. |
| 2012/0102387 A1 | 4/2012 | Badoiu et al. |

OTHER PUBLICATIONS

United States Patent and Trademark Office, Office Action, U.S. Appl. No. 11/706,040, mailed Jan. 6, 2012.

(56) References Cited

OTHER PUBLICATIONS

United States Patent and Trademark Office, Office Action, U.S. Appl. No. 11/706,040, mailed Sep. 20, 2011.
United States Patent and Trademark Office, Office Action, U.S. Appl. No. 11/706,040, mailed Jun. 10, 2013.
United States Patent and Trademark Office, Office Action, U.S. Appl. No. 11/706,040, mailed Jun. 27, 2012.
United States Patent and Trademark Office, Office Action, U.S. Appl. No. 11/705,983, mailed Jan. 5, 2011.
United States Patent and Trademark Office, Office Action, U.S. Appl. No. 11/842,490 mailed Nov. 15, 2010.
United States Patent and Trademark Office, Office Action, U.S. Appl. No. 11/842,490, mailed Jul. 8, 2010.
United States Patent and Trademark Office, Office Action, U.S. Appl. No. 11/706,039, mailed Feb. 18, 2011.
United States Patent and Trademark Office, Office Action, U.S. Appl. No. 11/706,039, mailed Sep. 2, 2010.
United States Patent and Trademark Office, Office Action, U.S. Appl. No. 11/702,460, mailed Jul. 21, 2010.
United States Patent and Trademark Office, Office Action, U.S. Appl. No. 11/702,460, mailed Feb. 17, 2010.
United States Patent and Trademark Office, Office Action, U.S. Appl. No. 11/748,236, mailed Sep. 19, 2011.
United States Patent and Trademark Office, Office Action, U.S. Appl. No. 11/748,236, mailed Mar. 30, 2011.
United States Patent and Trademark Office, Office Action, U.S. Appl. No. 11/788,673, mailed Dec. 24, 2012.
United States Patent and Trademark Office, Office Action, U.S. Appl. No. 11/788,673, mailed Aug. 15, 2012.
United States Patent and Trademark Office, Office Action, U.S. Appl. No. 11/788,673, mailed Dec. 8, 2009.
United States Patent and Trademark Office, Office Action, U.S. Appl. No. 11/788,673, mailed Jun. 24, 2009.
United States Patent and Trademark Office, Office Action, U.S. Appl. No. 11/766,293, mailed Aug. 1, 2012.
United States Patent and Trademark Office, Office Action, U.S. Appl. No. 11/766,293, mailed Mar. 15, 2012.
United States Patent and Trademark Office, Office Action, U.S. Appl. No. 11/766,293, mailed Sep. 6, 2011.
United States Patent and Trademark Office, Office Action, U.S. Appl. No. 11/766,293, mailed Mar. 28, 2011.
Final Office Action in Related U.S. Appl. No. 11/706,040, dated Jan. 28, 2013, 23 pages.

* cited by examiner

RENDERING OF VIDEO BASED ON OVERLAYING OF BITMAPPED IMAGES

BACKGROUND

Conventional desktop software applications enable users, such as film or video editors, to edit digital video content. One form of editing is known as non-linear editing. In particular, non-linear editing is a non-destructive editing method that enables access to frames of the video clip.

In such an instance, initially, video and audio data from a media source file can be digitized and recorded directly to a storage device that is local to the computer system. The media source file can then be edited on the computer using any of a wide range of video editing software and edit commands. Examples of video edit commands include splicing video segments together, applying effects to video, adding subtitles, etc.

According to one conventional application, video editor software resides at a remote client location with respect to a server. The server stores raw video that is being edited by the client. When the video editor at the remote location receives input from a user to apply an editing command to a particular segment of video, the video editor generates a request to the server to retrieve the segment for application of the video command.

Application of the edit command to the retrieved segment enables a user at the client to verify whether an applied edit under test produces the desired effect. If application of the command does not produce the desired effect, then the user can query the server again to apply the command in a different way such as at a different point in the segment. In this way, based on trial and error, a user can produce a desired resulting video experience.

The conventional video editor software at the remote location can receive the segment on a compressed format. Upon receipt of the video segment, the editor converts the compressed video received from the server into a format acceptable for rendering the video (with or without edits applied) on a display screen.

BRIEF DESCRIPTION

Conventional video editing applications such as those as discussed above suffer from a number of deficiencies. For example, as mentioned above, certain conventional applications require retrieval of compressed video at a specific location in which an edit command will be applied. In a client-server environment in which the client performs edits and the server provides the video for editing, there is typically substantial overhead such as delay and processing burden associated with retrieving a specific segment for editing and then applying an editing operation to the video segment. More specifically, a client must query the server for a specific video segment and thereafter apply commands to the video segment.

As mentioned above, according to conventional techniques, a video segment received from a server may be in a compressed format. In such an instance, the client cannot easily apply commands to the video segment received in the compressed video format. For example, assume that a user wishes to apply an overlay image to the received video segment. To achieve this end, the user may be able to adjust the timing of applying the overlay only by trial and error. For example, the user may specify when to apply the overlay with respect to a sequence of video frames so that the overly appears at the appropriate time when played back.

In certain cases, an overlay video must be precisely timed so that motion associated with objects in two different combined video sequences makes sense when subsequently viewed. In this latter scenario, precise timing may only be achieved by trial and error as the user must initially specify timing of two video sequences and thereafter make adjustments to the timing of sequences to ensure that they are properly synchronized. The editing process in such applications therefore can be time consuming.

Embodiments herein deviate with respect to conventional applications. For example, embodiments herein are directed to unique ways of facilitating video processing functions such as editing, playback, etc. As discussed below, certain embodiments herein enable advanced in-line previewing of video supporting more precise editing of videos. Other embodiments support a novel way of playing back video. Yet other embodiments serve other useful purposes as specifically discussed and implied below.

More specifically, one embodiment herein includes an application such as an editor application or media player application configured to receive video data. The application converts the video data into a first set of bitmaps. The first set of bitmaps defines a first sequence of static images associated with a video. In addition to receiving the video data, the application also receives modification data to be applied to the video. The application converts the modification data into a second set of bitmaps. The second set of bitmaps defines a second sequence of static images associated with the modification data. After creation of the bitmaps, the application then produces an output image sequence by combining the first sequence of static images with the second sequence of static images.

The application as discussed above can be implemented in a number of settings including a media player configured to retrieve one or more streams of video. For example, the media player can receive video according to a first format such as a compressed video format. The media player converts the video data and modification data into a second format such as a bitmap format. In accordance with instructions in a playback file defining a respective viewing experience, the bitmaps are then combined to produce an overall video experience for rendering on a display screen.

In yet further embodiments, the application as discussed above can be implemented in an editing environment to facilitate editing of video data and generation of a playback file. For example, in such an embodiment, the application converts received video data into multiple image bitmaps. Each of the image bitmaps defines a static image in a respective frame of video. The application stores the set of image bitmaps in a repository such as a cache for use of the bitmaps during an editing session. During the editing session, the application utilizes the multiple image bitmaps to produce a visual rendering of the video data. The application receives one or more video editing commands. The application initiates application of the one or more received video editing commands to the multiple image bitmaps to display a modified version of the video. In embodiments that utilize caching, various caching algorithms can be used such as first in first out, least recently used, most frequently used remains, and the like. In one caching configurations, the system caches the bitmap images corresponding to the first and second sequences of static images for use in subsequent production of another output image sequence thus saving processing by not having to reconvert video or edits to bitmaps again if those same video or edit frames are reused in another edit or playback sequence.

These and other embodiments will be discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as managing software resources. The instructions, when carried out by a processor of a respective computer device, cause the processor to:

The ordering of the steps has been added for clarity sake. These steps can be performed in any suitable order.

Another embodiment of the present disclosure is directed to a computer program product that includes a computer readable medium having instructions stored thereon for supporting operations such as providing software services. The instructions, when carried out by a processor of a respective computer device, cause the processor to: receiving video data; converting the video data into a first set of bitmaps, the first set of bitmaps defining a first sequence of static images associated with a video; receiving modification data to be applied to the video; converting the modification data into a second set of bitmaps, the second set of bitmaps defining a second sequence of static images associated with the modification data; and producing an output image sequence by combining the first sequence of static images with the second sequence of static images. As mentioned above, the ordering of the steps has been added for clarity sake, these steps can be performed in any suitable order.

Another embodiment herein is directed to a computer-implemented method in which at least one computer initiates execution of software instructions to perform steps of: receiving video data; converting the video data into multiple image bitmaps, each of the image bitmaps defining a static image in a respective frame of video; storing the set of image bitmaps for use during an editing session; during the editing session, utilizing the multiple image bitmaps to produce a visual rendering of the video data; receiving at least one video editing command; and initiating application of the at least one video editing command to the multiple image bitmaps to display a modified version of the video.

Other embodiments of the present disclosure include software programs to perform any of the method embodiment steps and operations summarized above and disclosed in detail below.

Also, it is to be understood that the system, method, apparatus, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems Incorporated of San Jose, Calif., USA.

As discussed above, techniques herein are well suited for use in software applications that enable modification and playback of data. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example configurations as described herein, a media application supports functions such as in-line display of video frame information for application of editing commands. The media application can receive video according to a first format. To facilitate editing, the media application converts the received video and/or other data into a second format such as into one or more bitmaps. In one embodiment, the media application generates a bitmap for each frame. The editor generates each of multiple frames in the in-line display based on respective bitmap information. The bitmaps associated with the in-line display can be generated and cached during an editing session for easy access. After completion of the editing session and creation of a playback file defining a media playback experience, the media manager deletes the cached bitmaps.

A user then makes the playback file available for distribution. As mentioned above, the playback file includes instructions defining a playback experience. The playback file can be made available to web users. Upon rendering of a video experience as specified by the playback file, a respective media player converts a format of video data as specified by the playback file into bitmap information again in a manner as discussed above. In an example implementation, the media player converts compressed video into bitmaps at a frame level. In accordance with instructions in the playback file, the media player combines multiple frames of static images (as defined by the bitmaps) at different layers to produce a rendition of video.

Figure 1:
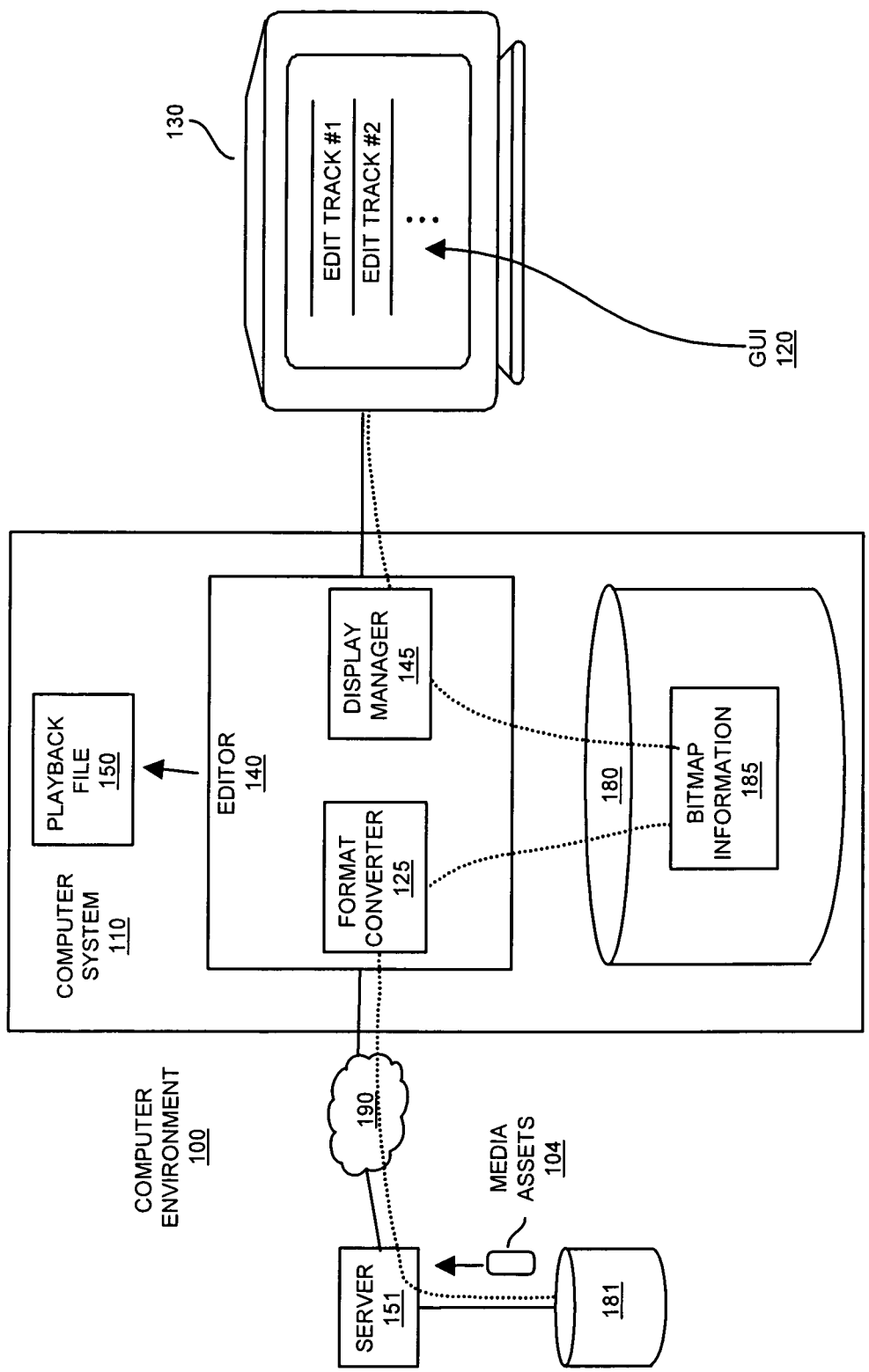
FIG. 1 is an example diagram of a computer environment in which an editor application supports video modification and viewing according to embodiments herein.

Now, more specifically, FIG. 1 is an example diagram of a computer environment 100 in which an editor 140 supports modification to content such as digital assets 104 according to embodiments herein.

As shown, computer environment 100 includes computer system 110, network 190, server 151, repository 181, and display screen 130. Repository 181 stores digital assets 104 that can be retrieved for viewing and generation of other videos. Computer system 110 includes editor 140 and repository 180. Repository 180 stores bitmap information 185 to render media on display screen 130. Editor 140 includes format converter 125 and display manager 145. Display screen 130 displays graphical user interface 120 enabling a respective user of computer system 110 to edit and combine tracks of video data in order to create a playback file 150.

In general, computer system 110 enables a respective user to create a playback file 150 for subsequent distribution to one or more entities over a network. In one embodiment, the playback file 150 specifies resources such as digital assets 104 that are to be used by a respective media player to create a video experience for playback by a respective viewer.

For example, to create a video experience, the user first selects which of multiple retrievable media assets 104 will be used to create the video experience. Media assets 104 can include different types of content such as audio information, video information, advertising information, overlay information, etc.

The media assets 104 retrieved from repository 181 or other source(s) can be formatted according to any number of multimedia, image, graphics or video data formats such as MPEG (Moving Pictures Expert Group) and its variants (MPEG-4, MPEG-4 Part 10, or MPEG-4 AVC and the like), AVI (Audio Video Interleave), SWF (Shockwave Flash), etc. In one embodiment, the different formats support compressed video, audio, etc.

Upon selection of one or more media assets 104, the editor 140 initiates retrieval of such assets over network 190 from one or more remote sources such as server 151. Note that retrieval of the one or more media assets 104 over a network is shown by way of non-limiting example only and that the assets can be retrieved in any other suitable manner as well such as locally from memory, a disk, etc.

In one embodiment, the computer system 110 can include a web browser interface enabling a respective user to browse the internet and identify different media assets 104 that are available for retrieval. To retrieve an asset, the user can initiate a request to a remote source such as server 151 to retrieve desired video and/or audio information.

To facilitate application of editing commands to retrieved assets for creation of playback file 150, the editor 140 employs format converter 125 to, as its name suggests, convert retrieved assets into bitmap information 185 for storage in repository 180. Note that by way of a non-limiting example, the repository 180 can be a cache or other accessible storage resource for storing the bitmap information 185. The conversion to bitmap format can be performed locally or remotely, prior to transmission.

As will be discussed in more detail later in this specification, conversion of retrieved digital information such as media assets 104 into bitmaps defining frames of static images enables more precise editing of video and/or audio information, thus, enabling creation of a playback file 150 that provides a more desirable viewing and/or listening experience.

Subsequent to conversion of one or more media assets 104 to a bitmap format and storage of corresponding bitmap information 185 in repository 180, the display manager 145 initiates display such as in-line previewing of the assets in graphical user interface 120. Display or playback of an asset based on a bitmap format can include retrieval of the bitmap information 185 from repository 180 and display of the corresponding one or more assets in editing tracks of graphical user interface 120.

Note that in addition to retrieving one or more assets from a remote source, a respective user operating computer system 110 and, more specifically, editor 140 can initiate creation of the editing information during an editing session. For example, a user can specify an overlay such as a subtitle to apply to respective frames of video. If desired, a subtitle overlay can be displayed in an editing track to indicate when and to which video a corresponding subtitle will be applied. Thus, the content used in the editing process can come from a number of sources. The edit process results in creation of modification data to be applied to the video.

Graphical user interface 120 enables the user to perform different operations in the edit tracks such as combining of frames of video, overlaying of subtitles on video, etc. to produce an overall resulting playback experience. As mentioned above, the editor 140 captures a playback experience produced during the editing session by storing playback instructions in playback file 150.

Playback instructions stored in playback file 150 can include one or more pointers to locations where corresponding audio and/or video can be retrieved, overlay information (i.e. reference to modification data) specifying subtitles to display in a playback experience, when and how to overlay different portions of video on each other, length of segments to play and when to play them, etc. Thus, via use of the playback file 150, a media player can recreate a viewing experience as defined by the playback file 150.

Local storage of bitmap information 185 in repository 180 alleviates a need to repeatedly retrieve the raw data from a remote source as the user performs different edits with respect to a video segment. For example, as mentioned above, a conventional application may require that the editor retrieve and apply a command to a specific segment of video being edited by a respective user. Such a process can be slow and cumbersome as a trial and error method of repeatedly playing back a video segment can require substantial processing each time for each edit. Embodiments herein alleviate the need to repeatedly retrieve the assets from a remote source. In one embodiment, the editor 140 performs a single conversion and caching of the retrieved assets into a bitmap format for use during the editing process. In this manner, the system receives video data and converts it to bitmap data (e.g. one bitmap image per video frame), and then receives edits (modification information) that are also converted to bitmap data. These can the be used to produce an output image sequence by combining (e.g. overlaying) the modification data (i.e. the edits) as bitmaps onto the bitmap images of the video data frames. By having everything in bitmap image format, combining is quick and easy and provides the ability to quickly and efficiently playback edits that accurately represent how the edits will appear.

Figure 2:
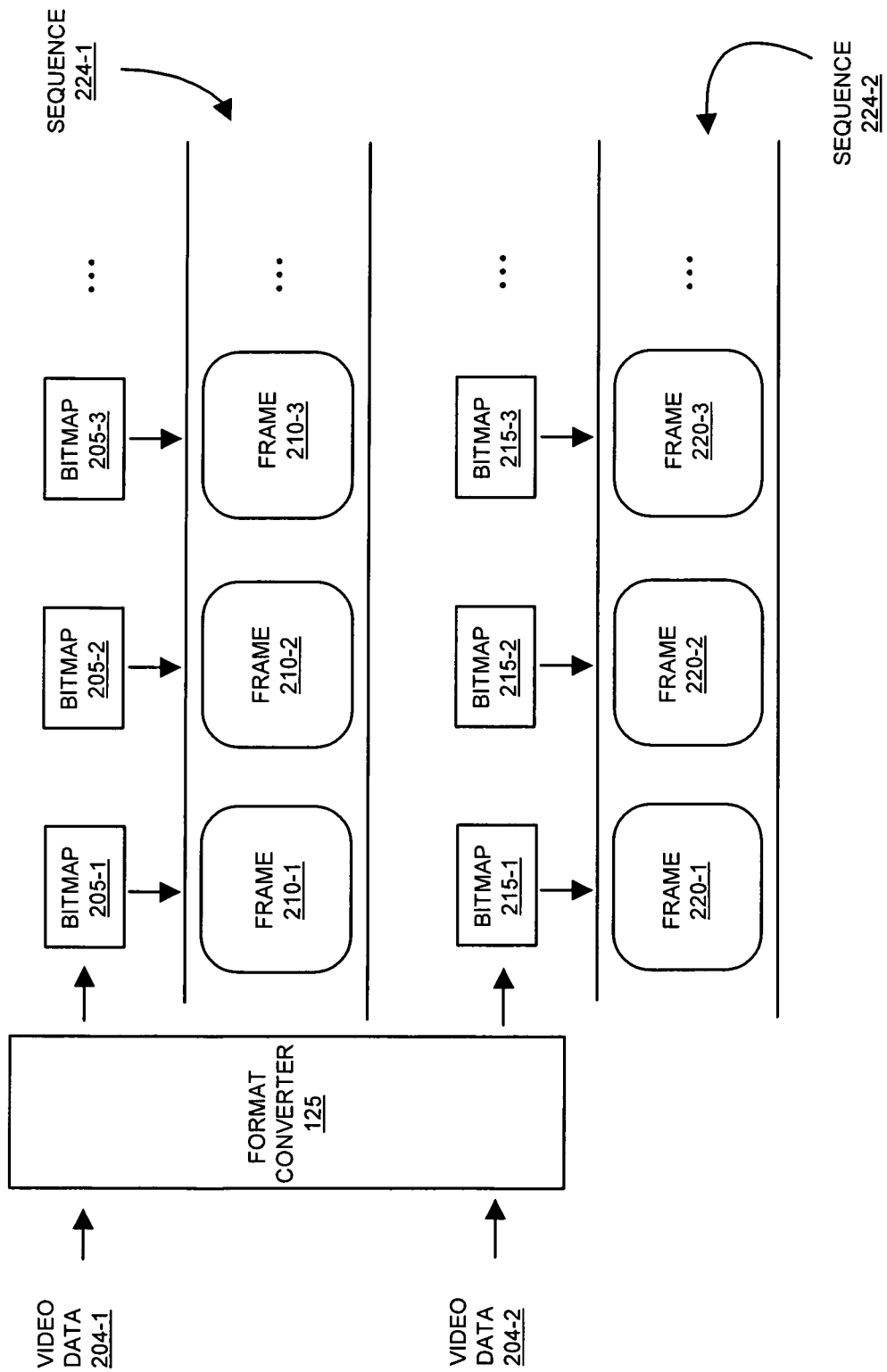
FIG. 2 is an example diagram illustrating conversion of received data into a bitmaps according to embodiments herein.

FIG. 2 is an example diagram illustrating conversion of received data into a sequence of one or more bitmaps according to embodiments herein.

As shown, the format converter 125 receives data such as video data 204-1 in a first format such as compressed video data and converts the data to another format such as a bitmap format.

More specifically, the format converter 125 converts the video data 204-1 (e.g., an example media asset 104 retrieved from a remote source) into a first sequence of bitmaps 205 including bitmap 205-1, bitmap 205-2, bitmap 205-3, etc.

Each of bitmaps 205 defines a respective frame of the video data 204-1. For example, bitmap 205-1 defines a static image associated with frame 210-1; bitmap 205-2 defines a static image associated with frame 210-2; bitmap 205-3 defines a static image associated with frame 210-3; and so on. Thus, a combination of bitmaps 205 defines a first sequence of static images associated with video data 204-1.

When rendering frames for in-line previewing based on bitmaps, each frame of the video sequence 224-1 appearing in respective editing track 410-1 includes a respective static image as specified by a corresponding bitmap 205 for the frame.

Note that the format converter 125 also can be configured to generate each of bitmaps 215 to define a respective frame of the video data 204-2. For example, in the example embodiment shown, bitmap 215-1 defines a static image associated with frame 220-1; bitmap 215-2 defines a static image associated with frame 220-2; bitmap 215-3 defines a static image associated with frame 220-3; and so on. Thus, each frame of the video sequence data 224-2 can include a respective static image as specified by a corresponding bitmap 215 for the frame. It is to be understood that while FIG. 1 illustrates the format converter 125 to be operating in the computer system 110 as part of the editor 140. In another embodiment, the bitmap conversion process of the video data can be performed in a server 550 prior to transmitting the bitmaps of the video data to the computer system 110 for use by the editor, or in later embodiments as will be explained, the bit map data received can be used by a media player (which does not have to do the conversion of video data to bitmap data itself).

In one embodiment, video data 204-2 represents modification data for applying to video data 204-1. In such an embodiment, the editor 140 receives the modification data (e.g., video data 204-2) to be applied or combined in some manner with the video data 204-1. The video data 204-2 can be image data such as a subtitle defining at least one image for overlaying onto the video data 204-1.

In furtherance of the above example, note that the video data 204-1 and/or video data 204-2 can be received as compressed video data such as MPEG. In such an embodiment, all or part of the video data 204 can be received in a compressed video format in which at least a portion of the video data (e.g., a stream of data) encoded with image difference information in the compressed video. The difference information in the video data 204 can specify a grouping of pixels and changes associated with the grouping of pixels from one frame to another frame in the video. For example, a first part of the stream can define setting of all pixels in a particular frame. Subsequent frames with respect to the particular frame may be very similar to the first frame other than changes to just a few pixels. In such an embodiment, the difference information specifies the pixel changes.

Embodiments herein can include generating a first bitmap associated with a first frame of a video; utilizing difference information in the received video data 204 to identify pixel changes between the first frame of the video and a second frame of the video; and generating the second frame of video based on the difference information in the compressed video data to account for the pixel changes from one frame to another.

Figure 3:
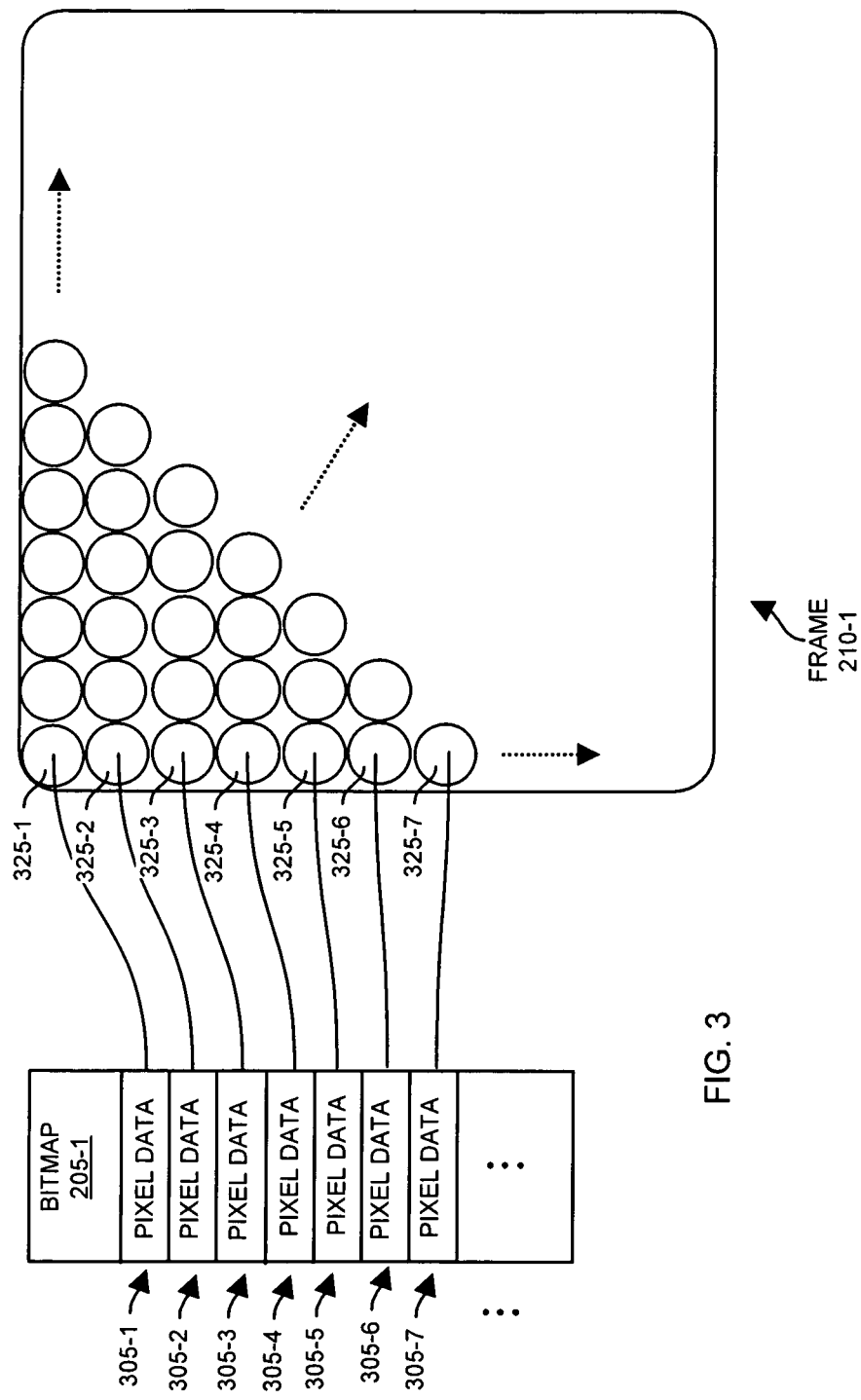
FIG. 3 is an example diagram of a bitmap according to embodiments herein.

FIG. 3 is an example diagram illustrating a bitmap according to embodiments herein. Note that each of the bitmaps as described herein can include similar information as discussed below.

For example, bitmap 205-1 includes pixel data 305 defining a state of a respective pixel 325 in frame 210-1. More specifically, pixel data 305-1 of bitmap 205-1 includes information indicating how to display pixel 325-1; pixel data 305-2 of bitmap 205-1 includes information indicating how to display pixel 325-2; pixel data 305-3 of bitmap 205-1 includes information indicating how to display pixel 325-3; pixel data 305-4 of bitmap 205-1 includes information indicating how to display pixel 325-4; pixel data 305-5 of bitmap 205-1 includes information indicating how to display pixel 325-5; pixel data 305-6 of bitmap 205-1 includes information indicating how to display pixel 325-6; pixel data 305-7 of bitmap 205-1 includes information indicating how to display pixel 325-7; and so on.

Pixel data 305 can include information specifying one or more types of display effects such as brightness, color, etc. associated with display of a respective pixel.

Note that the amount of information stored as pixel data 325-1 can vary depending on the application. Also, the pixel data 305 in a respective bitmap can be a single or multi-bit value depending on the embodiment.

The combination of pixels 325 in frame 210-1 can define a static image. As mentioned above, the static image in a respective frame 210-1 can be part of a sequence of frames that, when played in succession in a media player, produce a moving picture for viewing by a user. Thus, a static image in a frame can define part of a moving picture.

In one embodiment, the frame 210-1 (and other frames as described herein) comprises a field of 300×400 pixels. However, frame 210-1 can be any suitable size and have any suitable resolution, shape, etc.

Figure 4:
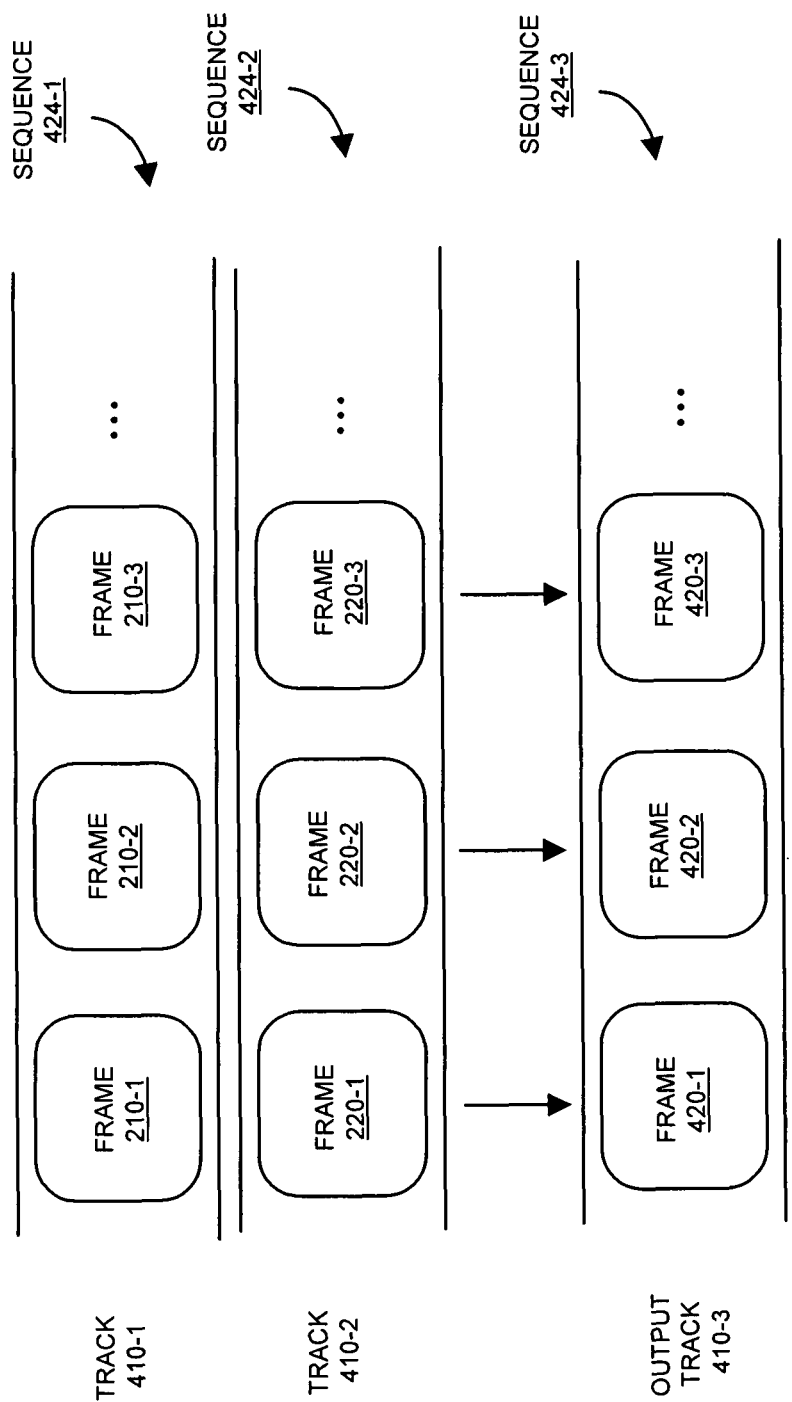
FIG. 4 is an example diagram illustrating use of bitmaps to display frames of static images according to embodiments herein.

FIG. 4 is an example diagram illustrating graphical user interface 120 for displaying an in-line preview of frames according to embodiments herein. As shown, graphical user interface 120 includes track 410-1, track 410-2, and output track 410-3. Track 410-1 displays a sequence 424-1 of one or more frames derived from video data 204-1. Track 410-2 displays a sequence 424-2 of one or more frames derived from video data 204-2.

As previously discussed, each frame is defined by a respective bitmap stored in a repository such as a cache. Display of static images in the frames of each track 410 can include reading data stored in a respective bitmap and subsequently rendering a respective display of the bitmap for viewing.

In one embodiment, the frames of static images displayed in the editing tracks are thumbnail versions of the actual images defined by a respective bitmap. Accordingly, the user can view the frames in any suitable size on the display screen 130.

As mentioned above, the video data in track 410-2 can be used to effectively modify the sequence of video displayed in track 410-1. For example, the sequence of frames in one or more respective tracks can be modification data. The display manager 145 of editor 140 enables a viewer to view frames, sequence of frames, etc., in tracks 410 so that a particular effect can be achieved. Providing display of each static image and frames enables very precise control over creating the output image sequence 424-3 displayed in output track 410-3.

Accordingly, embodiments herein can include a computer-implemented method in which the editor 140 processes a first image bitmap of the multiple image bitmaps to produce a first frame of video; the editor processes a second image bitmap of the multiple image bitmaps to produce a second frame of video; and the editor 140 initiates display of a sequence of video frames including the first frame and the second frame of video for application of one or more video editing commands.

As mentioned above, output sequence of frames 420 displayed in output track 410-3 provides an in-line preview of a video experience for playback by a respective user as discussed below.

Note that generation of the video sequence in output track 410-3, as described herein, using a combination of two video sequences is shown by way of non-limiting example only and that graphical user interface 120 can support other configurations such as combining three or more video sequences to produce an output sequence.

Further, graphical user interface 120 can support in-line previewing of only a single editing track 410 of video data to which modification data such as one or more editing commands is applied to produce a resulting video experience for subsequent viewing by a user. The editing commands can include movement of frames in a track to adjust a timing of combining frames.

As previously discussed, the editor 140 can be configured to generate a playback file 150 including specific timing and editing commands to be applied to one or more videos for producing an output video. The bitmap information in repository 180 can be deleted after completion of an editing session in which the playback file 150 is created. Thus, embodiments herein include enabling a respective user to create a playback file 150 based on application of modification commands to original raw data using bitmap information 185 temporarily stored in repository 180 during an editing session. As further discussed below, the bitmap information derived from media assets 104 can be recreated upon playback for generating a playback experience for viewing by a user.

Figure 5:
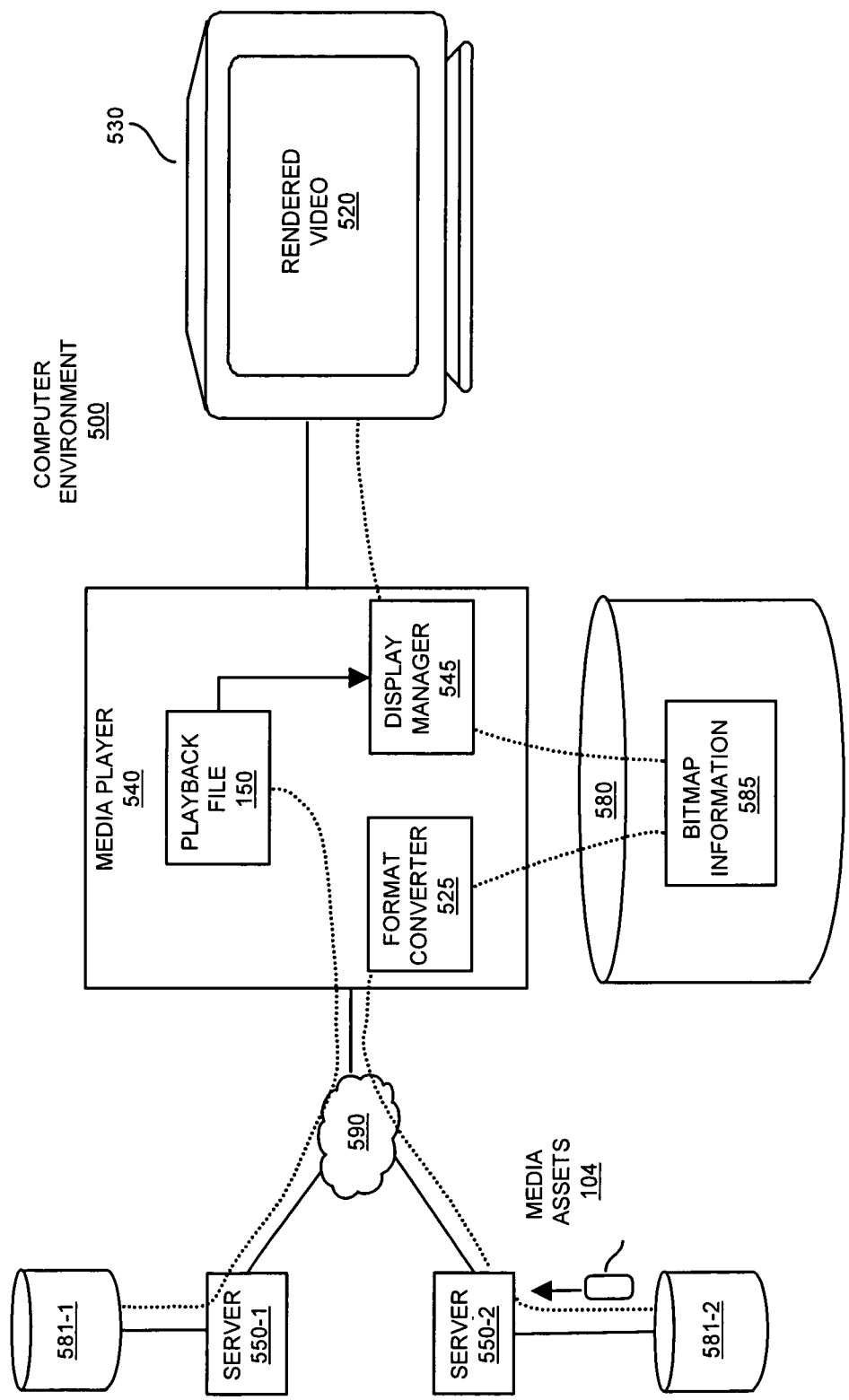
FIG. 5 is an example diagram illustrating a media player configured to convert retrieved data into bitmaps for subsequent playback of a video experience according to embodiments herein.

FIG. 5 is an example diagram illustrating a computer environment 500 enabling a respective media player to retrieve a playback file 150 and subsequently render video according to embodiments herein. For example, the playback file 150 generated by editor 140 as described herein can be stored in a publicly or privately accessible server 550-1.

The playback file 150 can be distributed to enable playback of a viewing experience by one or more entities. For example, in response to receiving a request to retrieve the playback file 150 via user selection of a resource such as a URL (Uniform Resource Locator) at browser, the media player 540 communicates over network 590 to server to retrieve the playback file stored in 581-1.

Subsequent to receipt of the playback file 150, the display manager 545 of media player 540 utilizes the playback file 150 to identify what to display on display screen 530 for viewing by the requesting user. For example, the display manager 545 identifies resources such as video, modification data, etc., as specified by the playback file 150 and initiates retrieval of such information (e.g., media assets 104) from one or more servers such as server 550-2.

The media player 540 can include a format converter 525 to convert a format of any retrieved digital assets 104 into bitmap information 585. The conversion can be done in a similar manner as discussed above for FIG. 4 to produce one or more vectors of frame sequences (each frame of which is defined by a respective bitmap). Alternatively as noted above, the bitmap conversion can take place in the server (for the media assets 104) prior to transmission to the media player. In a further alternate configuration, conversion of media assets to bitmap images (video frames, edits to the video, effects to be applied, and the like) can be performed by a third party service, such as a web service that operates in a separate computer from the server 151 (FIG. 1)/550 (FIG. 4) and is accessible via a web services protocol such as SOAP/XML to receive native video or other graphic data, and convert those frames or graphics or edits to bitmaps, and returns the bitmaps to the requesting device, or to a secondary computer. Thus the servers 151/550 in one configuration can transmit the media assets to this web service (operating in a third party computer not shown) which performs the conversion, and then forwards the converted data now in bitmap form to the media player 540 (or to the computer system 110 for FIG. 1).

Also as discussed above, the frames of static images can be overlaid on to each other in accordance with instructions in the playback file 150 to produce a respective bitmap for each frame in an output sequence. The media player initiates display of the output sequence on display screen 530 as rendered video 520. Accordingly, media assets 104 such as compressed video, modification data, etc., can be converted into one or more sequences of static frames of images. The images in respective frames can be overlaid or modified in accordance with instructions in the playback file 150, as described herein, and displayed for viewing on display screen 530 as rendered video 520. Thus, combining of the images in different tracks can be done in the media player 540.

Figure 6:
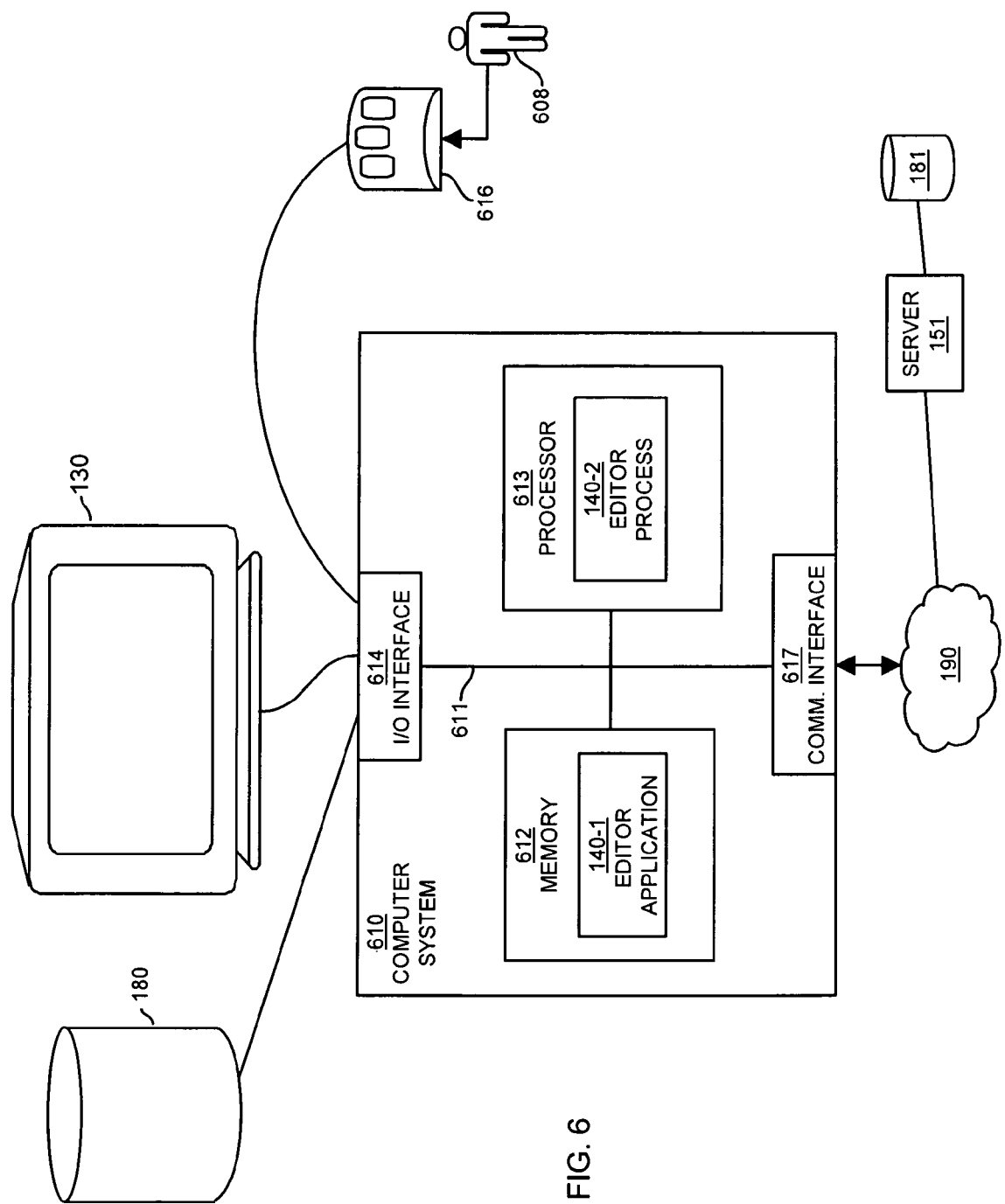
FIG. 6 is a diagram illustrating an example computer architecture or computer system for carrying out functionality according to embodiments herein.

FIG. 6 is a block diagram of an example environment including an architecture of a respective computer system 610 for implementing any functions such as the editor application, display manager application, etc., according to embodiments herein.

Computer system 610 can be a computerized device such as a personal computer, workstation, portable computing device, console, network terminal, processing device, network device, etc.

Note that the following discussion provides a basic embodiment indicating how to carry out functionality associated with editor application 140-1. It should be noted that the actual configuration for carrying out the operations as described herein can vary depending on a respective application.

As shown, computer system 610 of the present example includes an interconnect 611 that couples a memory system 612, a processor 613, I/O interface 614, and a communications interface 617. I/O interface 614 provides connectivity to peripheral devices 616, if such devices are present, such as a keyboard, mouse, display screen 130, etc.

User 608 can provide input to computer system 610. Communications interface 617 enables computer system 610 and, more particularly, editor application 140-1 to communicate over network 190 to retrieve information from remote sources. I/O interface 614 enables the editor application 140-1 to retrieve locally stored information from repository 180.

As shown, memory system 612 can be encoded with editor application 140-1 that supports functions as discussed above and as discussed further below. The editor application 140-1 can be embodied as software code such as data and/or logic instructions. When executed, the code stored on a computer storage medium can support processing functionality according to different embodiments described herein.

During operation of one embodiment, processor 613 accesses memory system 612 via the use of interconnect 611 in order to launch, run, execute, interpret or otherwise perform the logic instructions of the editor application 140-1. Execution of the editor application 140-1 produces processing functionality in editor process 140-2. In other words, the editor process 140-2 represents one or more portions of the editor application 140-1 performing within or upon the processor 613 in the computer system 610.

It should be noted that, in addition to the editor process 140-2 that carries out method operations as discussed herein, other embodiments herein include the editor application 140-1 itself such as the un-executed or non-performing logic instructions and/or data. As mentioned, the editor application 140-1 may be stored on a computer storage medium (e.g., a repository) such as a floppy disk, hard disk or in an optical medium. According to other embodiments, the editor application 140-1 can also be stored in a memory type system such as in firmware, read only memory (ROM), or, as in this example, as executable code within the memory system 612 (e.g., within Random Access Memory or RAM).

In addition to these embodiments, it should also be noted that other embodiments herein include the execution of the functionality as described herein via processor 613. Thus, those skilled in the art will understand that the computer system 610 can include other processes and/or software and hardware components, such as an operating system that controls allocation and use of hardware resources.

As mentioned above, the computer system 610 can support execution of editor application 140-1 according to embodiments herein. It should be noted that a similar type of computer architecture with a processor, memory, and executable software instructions can be used to support execution of the media player 540 or other functionality as described herein.

Functionality supported by computer system 610 and, more particularly, functionality associated with the editor 140 (and media player 540) will now be discussed via flowcharts in FIGS. 7-10. As discussed above, the editor 140 or media player can be configured to execute the steps in the flowcharts.

Note that there will be some overlap with respect to concepts discussed above for FIGS. 1 through 7. Also, note that the steps in the below flowcharts need not always be executed in the order shown.

Figure 7:
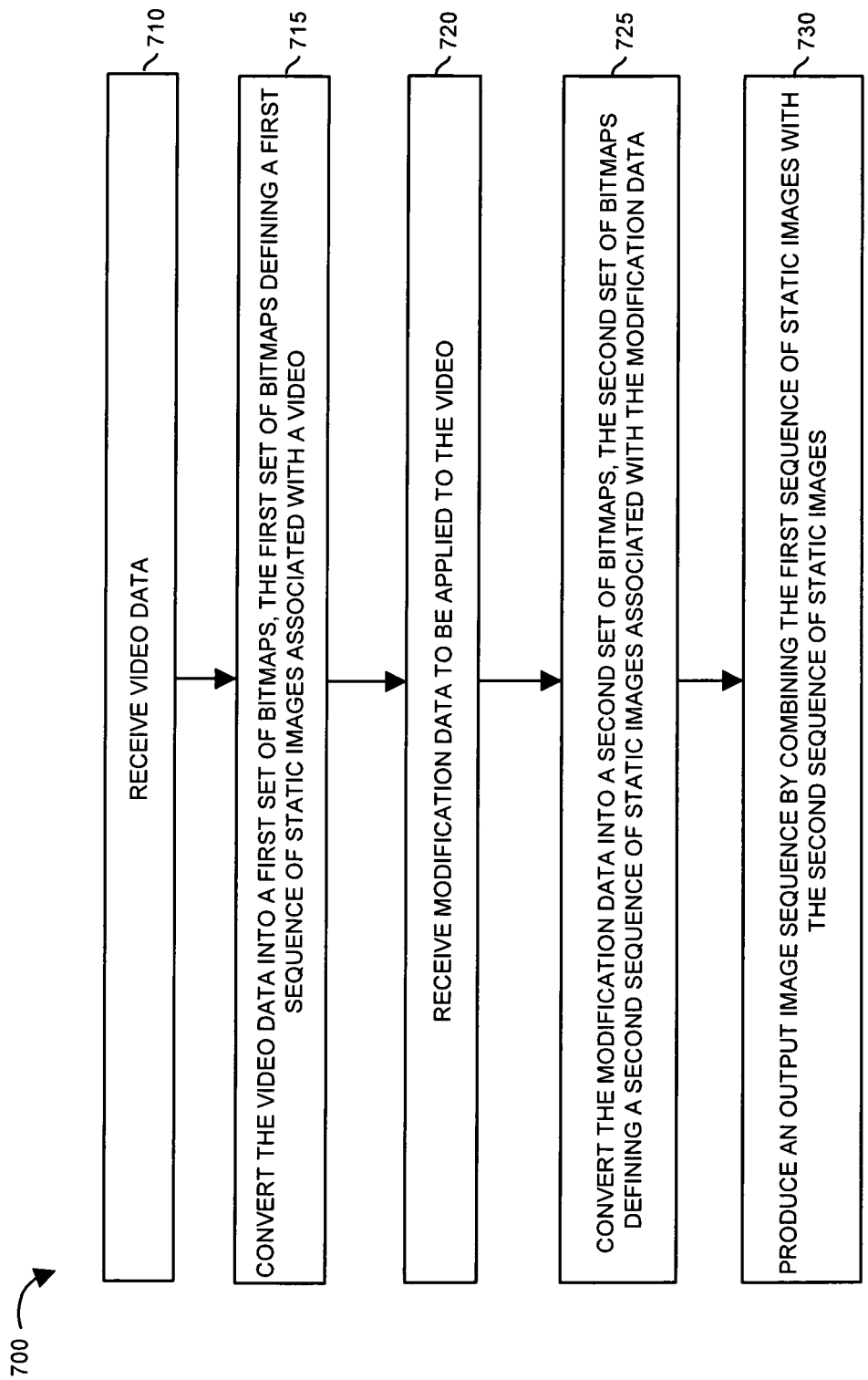
FIG. 7 is a flowchart illustrating an example method in which a computer environment supports use of image bitmaps according to embodiments herein.

FIG. 7 is a flowchart 700 illustrating a technique of processing received data and producing a viewing experience according to embodiments herein.

In step 710, the editor 140 receives video data.

In step 715, the editor 140 converts the video data into a first set of bitmaps. The first set of bitmaps defines a first sequence of static images associated with a video.

In step 720, the editor application receives modification data to be applied to the video.

In step 725, the editor 140 converts the modification data into a second set of bitmaps. The second set of bitmaps defines a second sequence of static images associated with the modification data.

In step 730, the editor 140 produces an output image sequence by combining the first sequence of static images with the second sequence of static images. Combining of images can include selecting a set of pixels in one frame in a first sequence and filling in remaining pixels with respective pixel in a frame of a second sequence. This can be repeated for each of multiple images.

Figure 8:
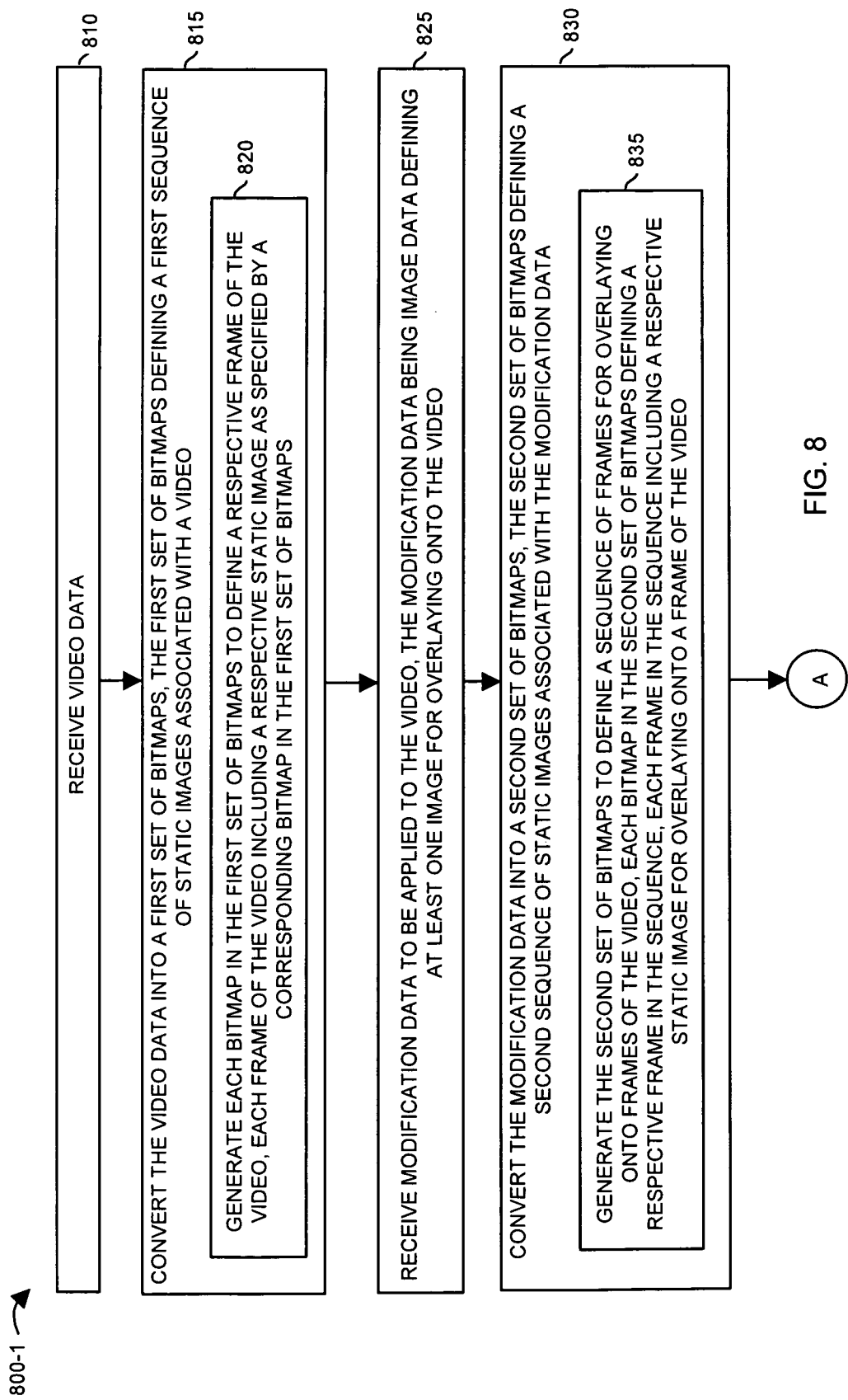
FIGS. 8 and 9 combine to form a flowchart illustrating an example method of use of image bitmap information to provide a video experience according to embodiments herein.
Figure 9:
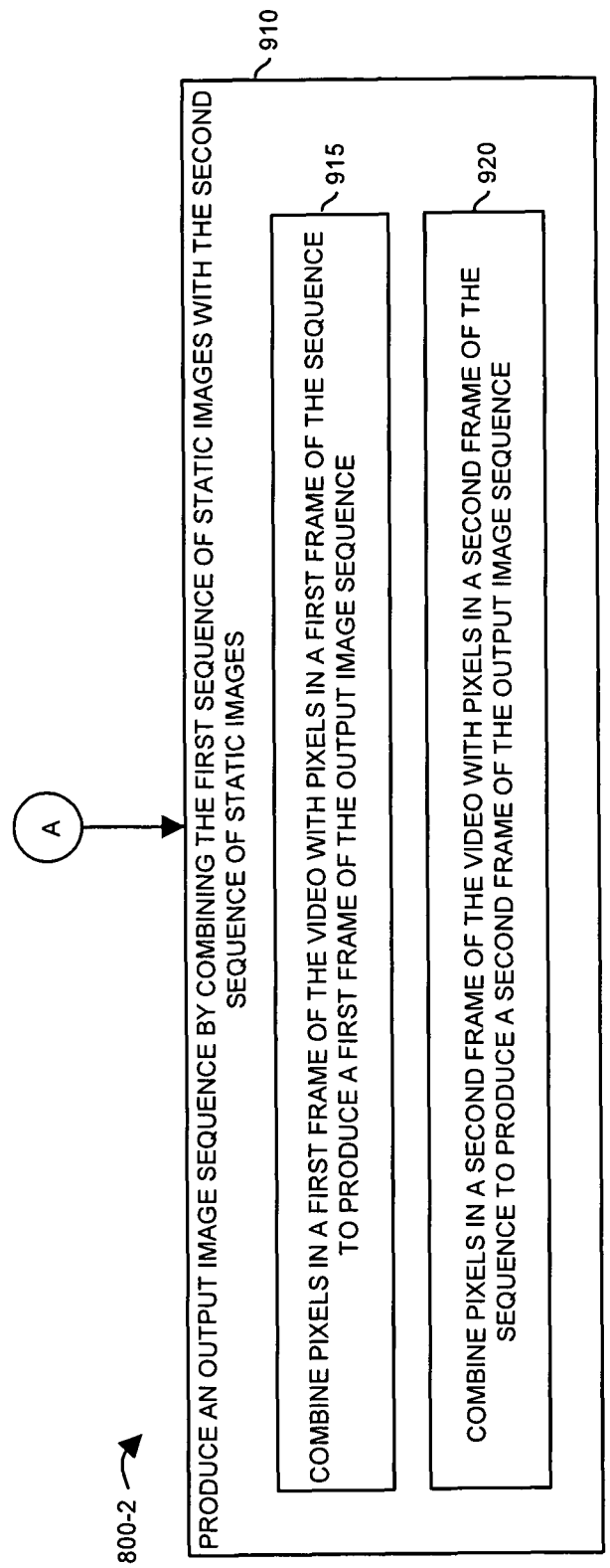

FIGS. 8 and 9 combine to form a more detailed flowchart 800 (e.g., flowchart 800-1 and flowchart 800-2) illustrating a technique of processing received data and producing a viewing experience according to embodiments herein.

In step 810, the editor 140 receives video data.

In step 815, the editor 140 converts the video data into a first set of bitmaps. The first set of bitmaps defines a first sequence of static images associated with a video.

In step 820, the editor 140 generates each bitmap in the first set of bitmaps to define a respective frame of the video. Each frame of the video can include a respective static image as specified by a corresponding bitmap in the first set of bitmaps.

In step 825, the editor 140 receives modification data to be applied to the video. The modification data can be image data defining at least one image for overlaying onto the video.

In step 830, the editor 140 converts the modification data into a second set of bitmaps. The second set of bitmaps defines a second sequence of static images associated with the modification data.

In step 835, the editor 140 generates the second set of bitmaps to define a sequence of frames for overlaying onto frames of the video. Each bitmap in the second set of bitmaps defines a respective frame in the sequence. Each frame in the sequence includes a respective static image for overlaying onto a frame of the video.

In step 910 of FIG. 9, the editor 140 produces an output image sequence by combining the first sequence of static images with the second sequence of static images.

In step 915, the editor 140 combines pixels in a first frame of first sequence with pixels in a first overlay frame of the second sequence to produce a first frame of the output image sequence.

In step 920, the editor 140 combines pixels in a second frame of first sequence with pixels in a second overlay frame of the second sequence to produce a second frame of the output image sequence.

Figure 10:
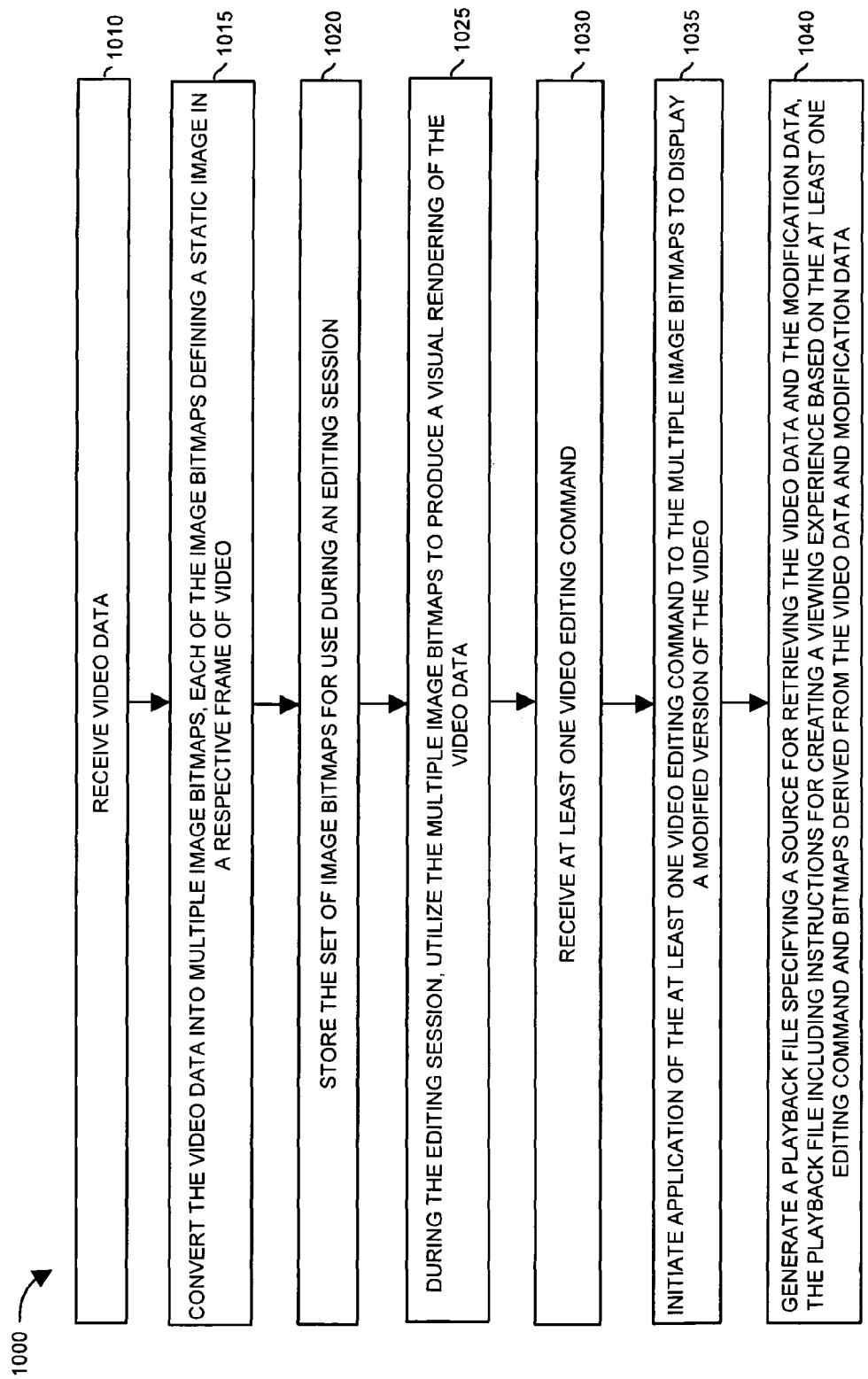
FIG. 10 is a flowchart illustrating an example method in which a computer environment supports use of image bitmap information according to embodiments herein.

FIG. 10 is a flowchart 1000 illustrating a technique of generating and utilizing bitmap information according to embodiments herein.

In step 1010, the editor 140 receives video data.

In step 1015, the editor 140 converts the video data into multiple image bitmaps. Each of the image bitmaps defines a static image in a respective frame of video.

In step 1020, the editor 140 stores the set of image bitmaps in a cache for use of the video during an editing session.

In step 1025, during the editing session, the editor 140 utilizes the multiple image bitmaps to produce a visual rendering of the video data.

In step 1030, the editor 140 receives at least one video editing command.

In step 1035, the editor 140 initiates application of the at least one video editing command to the multiple image bitmaps to display a modified version of the video.

In step 1040, the editor 140 generates a playback file specifying a source for retrieving the video data and the modification data. The playback file can include instructions for creating a viewing experience based on the at least one editing command and bitmaps derived from the video data and modification data.

Note again that techniques herein are well suited for management and playback of video data as described herein. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:

receiving, by a video editing application, first video data associated with a video, the first video data being in a first video format;

receiving, by the video editing application, second video data in a second format; and generating, by the video editing application, a playback file, the playback file comprising:

at least one reference to a location corresponding to the first video data;

at least one reference to a location corresponding to the second video data; and timing information for combining the first video data with the second video data, wherein the playback file is configured to cause a media player, when executed by the media player, to:

retrieve the first video data associated with the video from the location corresponding to the first video data;

convert the first video data in the first video format into a first set of static images, each image in the first set of static images comprising a first image format, the first image format different than the first video format;

retrieve the second video data from the location corresponding to the second video data;

convert the second video data into a second set of static images;

generate a third set of static images, each image of a first subset of the third set of static images comprising an overlay of at least a portion of an image from the first set of static images and at least a portion of an image from the second set of static images based at least in part on the timing information; and display a second subset of the third set of static images.

2. The method of claim 1 further comprising:

converting, by the video editing application, the first video data in the first video format into the first set of static images;

converting, by the video editing application, the second video data into the second set of static images;

displaying, by the video editing application, a first subset of the first set of static images in a first editing track in a graphical user interface associated with the video editing application;

displaying, by the video editing application, a second subset of the second set of static images in a second editing track in the graphical user interface;

generating, by the video editing application, the third set of static images; and displaying, by the video editing application, a third subset of the third set of static images in a third editing track in the graphical user interface.

3. The method of claim 1 further comprising:

receiving, by the video editing application, selection of a media asset from a plurality of available media assets, the media asset comprising the first video data associated with the video; and wherein receiving, by the video editing application, first video data associated with the video comprises:

retrieving, by the video editing application, the selected media asset from at least one remote source.

4. The method of claim 1 wherein each image in the second set of static images comprises a second image format, the second image format different than the second format.

5. The method of claim 2:
wherein receiving, by the video editing application, first video data associated with the video comprises:
receiving, by the video editing application, compressed video data, wherein at least a portion of the compressed video data is encoded with image difference information specifying a grouping of pixels and changes associated with the grouping of pixels from a first frame to a second frame of the video; and
wherein converting, by the video editing application, the first video data in the first video format into the first set of static images comprises:
generating a first bitmap image associated with the first frame;
utilizing the image difference information to identify pixel changes between the first frame and the second frame of the video; and
generating a second bitmap image based at least in part on the difference information, the second bitmap associated with the second frame.

6. The method of claim 1 wherein the second video data comprises at least one image for overlaying onto at least a portion of the video.

7. The method of claim 1 wherein the first video format and the second format comprise a same format.

8. A method comprising:
receiving, by a media player, a playback file, the playback file comprising:
a reference to a location corresponding to first video data;
a reference to a location corresponding to second video data; and
information for combining the first video data with the second video data,
wherein the playback file is configured to cause the media player, when received by the media player, to:
retrieve the first video data based at least in part on the reference to the location corresponding to the first video data, the first video data associated with a video, the first video data being in a first video format;
convert the first video data in the first video format into a first set of static images, each image in the first set of static images comprising a first image format, the first image format different than the first video format;
store each image in the first set of static images in a repository;
retrieve the second video data based at least in part on the reference to the location corresponding to the second video data, the second video data being in a second format;
convert the second video data into a second set of static images;
store each image in the second set of static images in the repository;
generate a third set of static images, each image of a first subset of the third set of static images comprising an overlay of at least a portion of an image from the first set of static images retrieved from the repository and at least a portion of an image from the second set of static images retrieved from the repository based at least in part on the information for combining the first video data with the second video data in the playback file; and
display a second subset of the third set of static images in a graphical user interface associated with the media player.

9. A non-transitory computer-readable medium comprising program code for:
receiving, by a video editing application, first video data associated with a video, the first video data being in a first video format;
receiving, by the video editing application, second video data in a second format; and
generating, by the video editing application, a playback file, the playback file comprising:
at least one reference to a location corresponding to the first video data;
at least one reference to a location corresponding to the second video data; and
timing information for combining the first video data with the second video data,
wherein the playback file is configured to cause a media player, when executed by the media player, to:
retrieve the first video data associated with the video from the location corresponding to the first video data;
convert the first video data in the first video format into a first set of static images, each image in the first set of static images comprising a first image format, the first image format different than the first video format;
retrieve the second video data from the location corresponding to the second video data;
convert the second video data into a second set of static images;
generate a third set of static images, each image of a first subset of the third set of static images comprising an overlay of at least a portion of an image from the first set of static images and at least a portion of an image from the second set of static images based at least in part on the timing information; and
display a second subset of the third set of static images.

10. The non-transitory computer-readable medium of claim 9 further comprising program code for:
converting, by the video editing application, the first video data in the first video format into the first set of static images;
converting, by the video editing application, the second video data into the second set of static images;
displaying, by the video editing application, a first subset of the first set of static images in a first editing track in a graphical user interface associated with the video editing application;
displaying, by the video editing application, a second subset of the second set of static images in a second editing track in the graphical user interface;
generating, by the video editing application, the third set of static images; and
displaying, by the video editing application, a third subset of the third set of static images in a third editing track in the graphical user interface.

11. The non-transitory computer-readable medium of claim 9 further comprising program code for:
receiving, by the video editing application, selection of a media asset from a plurality of available media assets, the media asset comprising the first video data associated with the video; and
wherein receiving, by the video editing application, first video data associated with the video comprises:

retrieving, by the video editing application, the selected media asset from at least one remote source.

12. The non-transitory computer-readable medium of claim 9 wherein each image in the second set of static images comprises a second image format, the second image format different than the second format.

13. The non-transitory computer-readable medium of claim 10:
wherein receiving, by the video editing application, first video data associated with the video comprises:
receiving, by the video editing application, compressed video data, wherein at least a portion of the compressed video data is encoded with image difference information specifying a grouping of pixels and changes associated with the grouping of pixels from a first frame to a second frame of the video; and
wherein converting, by the video editing application, the first video data in the first video format into the first set of static images comprises:
generating a first bitmap image associated with the first frame;
utilizing the image difference information to identify pixel changes between the first frame and the second frame of the video; and
generating a second bitmap image based at least in part on the difference information, the second bitmap associated with the second frame.

14. The non-transitory computer-readable medium of claim 9 wherein the second video data comprises at least one image for overlaying onto at least a portion of the video.

15. The non-transitory computer-readable medium of claim 9 wherein the first video format and the second format comprise a same format.

16. A system comprising:
a display;
a repository;
a network interface; and
a processor in communication with the display, the repository, and the network interface, the processor configured for:
receiving first video data associated with a video through the network interface, the first video data being in a first video format;
receiving second video data through the network interface, the second video data being in a second format; and
generating a playback file, the playback file comprising:
at least one reference to a location corresponding to the first video data;
at least one reference to a location corresponding to the second video data; and
timing information for combining the first video data with the second video data, wherein the playback file is configured to cause a media player, when executed by the media player, to:
retrieve the first video data associated with the video from the location corresponding to the first video data;
convert the first video data in the first video format into a first set of static images, each image in the first set of static images comprising a first image format, the first image format different than the first video format;
retrieve the second video data from the location corresponding to the second video data;
convert the second video data into a second set of static images;
generate a third set of static images, each image of a first subset of the third set of static images comprising an overlay of at least a portion of an image from the first set of static images and at least a portion of an image from the second set of static images based at least in part on the timing information; and
display a second subset of the third set of static images.

17. The system of claim 16 wherein the processor is further configured for:
converting the first video data in the first video format into the first set of static images;
converting the second video data into the second set of static images;
displaying, on the display, a first subset of the first set of static images in a first editing track in a graphical user interface associated with the video editing application;
displaying, on the display, a second subset of the second set of static images in a second editing track in the graphical user interface;
generating the third set of static images; and
displaying, on the display, a third subset of the third set of static images in a third editing track in the graphical user interface.

18. The system of claim 16 wherein the processor is further configured for:
receiving selection of a media asset from a plurality of available media assets, the media asset comprising the first video data associated with the video; and
wherein receiving first video data associated with the video through the network interface comprises:
retrieving the media asset from at least one remote server through the network interface.

19. The system of claim 16 wherein each image in the second set of static images comprises a second image format, the second image format different than the second format.

20. The system of claim 17:
wherein receiving first video data associated with the video through the network interface comprises:
receiving compressed video data, wherein at least a portion of the compressed video data is encoded with image difference information specifying a grouping of pixels and changes associated with the grouping of pixels from a first frame to a second frame of the video; and
wherein converting the first video data in the first video format into the first set of static images comprises:
generating a first bitmap image associated with the first frame;
utilizing the image difference information to identify pixel changes between the first frame and the second frame of the video; and
generating a second bitmap image based at least in part on the difference information, the second bitmap associated with the second frame.

21. The system of claim 16 wherein the second video data comprises at least one image for overlaying onto at least a portion of the video.

22. The system of claim 16 wherein the first video format and the second format comprise a same format.

23. The system of claim 16 wherein the repository comprises at least one cache.

24. The system of claim 16 wherein the processor is further configured for:
receiving the first video data and the second video data through the network interface substantially simultaneously.

25. The method of claim 2 further comprising:
   storing, by the video editing application, each image in the first set of static images in a repository; and
   storing, by the video editing application, each image in the second set of static images in the repository; and
   after generating the playback file, deleting the first set of static images and the second set of static images from the repository.

26. The method of claim 25 wherein the repository comprises at least one cache.

27. The non-transitory computer-readable medium of claim 10 further comprising program code for:
   storing, by the video editing application, each image in the first set of static images in a repository; and
   storing, by the video editing application, each image in the second set of static images in the repository; and
   after generating the playback file, deleting the first set of static images and the second set of static images from the repository.

28. The non-transitory computer-readable medium of claim 27 wherein the repository comprises at least one cache.

29. The system of claim 16 wherein the processor is further configured for:
   storing, by the video editing application, each image in the first set of static images in the repository; and
   storing, by the video editing application, each image in the second set of static images in the repository; and
   after generating the playback file, deleting the first set of static images and the second set of static images from the repository.

* * * * *